United States Patent [19]

Siczek

[11] Patent Number: 4,760,589
[45] Date of Patent: Jul. 26, 1988

[54] GRID CABINET AND CASSETTE TRAY FOR AN X-RAY EXAMINATION APPARATUS

[76] Inventor: Aldona A. Siczek, 1252 Chinook Way, Boulder, Colo. 80303

[21] Appl. No.: 853,940
[22] Filed: Apr. 21, 1986
[51] Int. Cl.⁴ ............................................. G21K 1/00
[52] U.S. Cl. .................................... 378/155; 378/151; 378/181
[58] Field of Search ............... 378/150, 151, 154, 155, 378/181, 182, 175, 176

[56] References Cited

U.S. PATENT DOCUMENTS

| | | | |
|---|---|---|---|
| 2,132,774 | 10/1938 | Brown | 378/155 |
| 2,767,323 | 10/1956 | Stava et al. | 378/155 |
| 2,938,120 | 5/1960 | Forsyth | 378/155 |
| 4,099,063 | 7/1978 | Pury et al. | 378/176 |
| 4,105,920 | 8/1978 | Pury et al. | 378/176 |
| 4,232,227 | 11/1980 | Finkenzeller et al. | 378/151 |
| 4,538,293 | 8/1985 | Cutter | 378/182 |

*Primary Examiner*—Craig E. Church
*Assistant Examiner*—John C. Freeman

[57] ABSTRACT

An improved radiological device comprising a grid cabinet and an X-ray cassette tray, including: means for cassette size sensing disposed in the cabinet and allowing for automatic collimation of an X-ray beam by a direct mechanical linkage of sensing components with shutter controls; means for centering a cassette including two pivotal arms pivoting about respective points positioned in two different places on the tray; ball rolling slides for all linear movements; means for actuating a grid frame being very compact and disposed in the back of the cabinet and, firstly, accelerating the grid substantially instantaneously to high speeds for very short exposure times; secondly, slowing the grid down for medium exposure times; and thirdly, reversing the grid travel direction at random points.

12 Claims, 7 Drawing Sheets

GRID CABINET AND CASSETTE TRAY FOR AN X-RAY EXAMINATION APPARATUS

FIELD OF THE INVENTION

This invention relates to diagnostic X-ray apparatus and more particularly to: (a) an improved grid cabinet and (b) a film cassette tray. The grid cabinet can either include a stationary grid or a movable grid. The grid cabinet with a movable grid is also known as Bucky.

BACKGROUND OF THE INVENTION

In X-ray medical examinations the X-ray films of varying sizes conventionally packaged in cassettes are used. Generally, a film cassette is placed on the cassette tray which in turn is inserted into the grid cabinet. To screen secondary radiation from the film, stationary or moving lead line grids are used. Reciprocatory movement of the grids over the film prevents the grid lines from being photographed. It is desirable to have the film cassette automatically centered in the grid cabinet in such a way that the film is aligned with the X-ray beam. It is also desirable to sense the size of the film cassette and automatically communicate this information to a beam collimator for an automatic adjustment of the collimator's shutters in order to match the area of the X-ray beam with the film size. Linear or rotary potentiometers are used for communicating the information.

There are several cassette trays on the market which feature automatic centering of the film cassette and cassette size sensing for automatic collimation. All of the existing arts use a very similar centering system utilizing four jaws sliding from the center of the tray. Generally, means for cassette centering and means for cassette size sensing with sensing potentiometers are disposed in the tray, said tray being completely removable from the grid cabinet. Means for actuating grid to move over the film is traditionally disposed in the side of the cabinet and the grid motion is usually reciprocatory linear or damping sinusoidal.

SUMMARY OF INVENTION

A device, according to this invention, comprising a grid cabinet and a cassette tray offers the following significant improvements:

(1) means for sensing both the width and the length of a cassette, is disposed in the cabinet and not in the tray eliminating a need for an electrical connector between the cabinet and the tray. This system allows for an alternative automatic collimation of an X-ray beam with the cassette size by a direct mechanical linkage of sensing components with the controls of the collimator's shutters and, therefore, eliminating a need for conventionally used potentiometers and servomechanisms and substantially reducing cost.

(2) means for centering a cassette in the tray comprising of pivotal arms adapted to open respective pairs of cassette centering jaws and pivoting about respective pivot points located in two different places on the tray; this system allows for a substantial reduction in the thickness of the tray.

(3) specially designed ball rolling slides as guide means for all linear movements of the tray, the centering jaws and a grid frame which utilize structure of the moving components as an integral structure of the slides. This design offers smooth motion, friction reduced only to rolling and greater durability.

(4) two ways for inserting a grid into the frame; (a) from the top, (b) from the front of the frame.

(5) means for actuating a grid in the grid frame to move over the cassette compact enough to be disposed in the back of the cabinet and not on the side as in the previous art; this allows for reduced width of the cabinet and, therefore, for a longer travel of said cabinet in the X-ray table and, as a result, for larger coverage of a patient.

(6) the means for actuating the grid with a specially designed cam aided by a progressive spring to: firstly, accelerate the grid substantially instantaneously to a high speed to allow for very short exposures; secondly, to slow the grid down to accommodate longer exposures; and further, including an off-set bushing affixed to a cam follower to reverse the grid travel direction at random points.

DETAILED DESCRIPTION OF THE DRAWINGS

Figure 1:
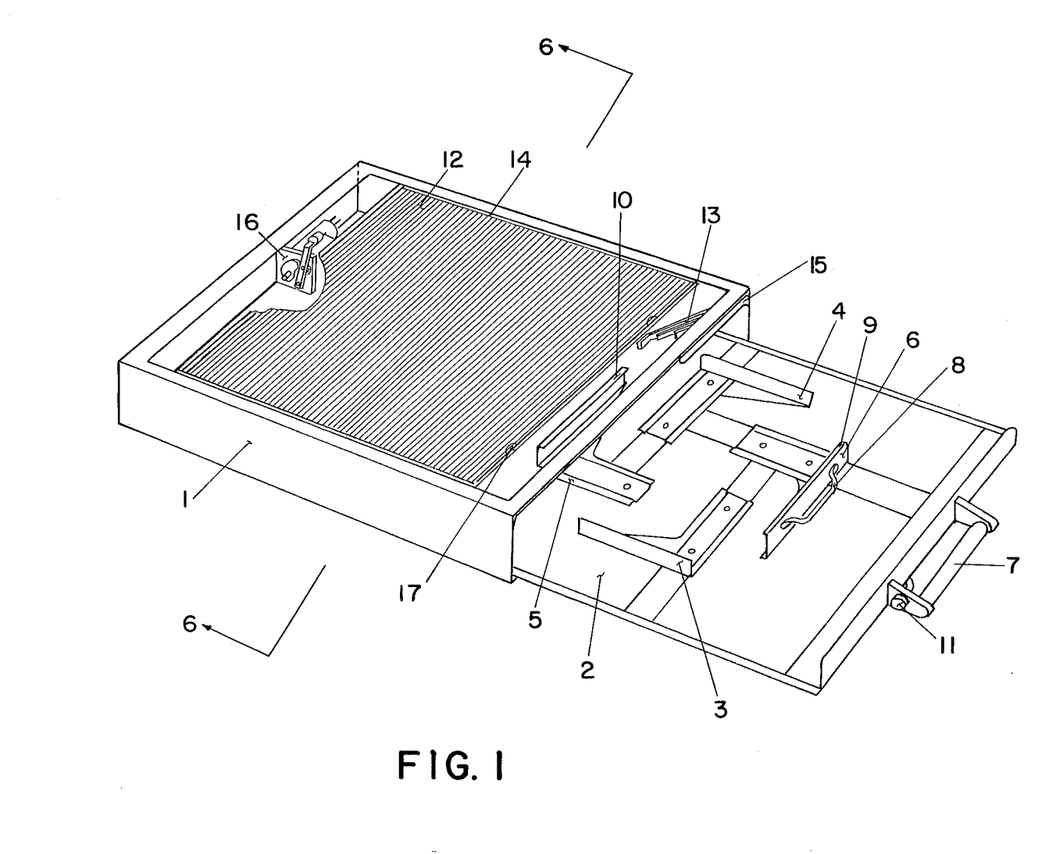
FIG. 1 illustrates a grid cabinet with a cassette tray.

FIG. 1 illustrates a grid cabinet 1 with an X-ray film cassette tray 2, also known as a cassette holder, which slides in and out of the cabinet 1. The tray 2 does not separate completely from the cabinet 1, but slides out only to the position shown in FIG. 1 to allow for easy inserting or removing of film cassettes. The tray 2 locks automatically at both farthermost inner and outer positions. The lock holding the tray 2 in either of the end positions can be released by squeezing the trigger 11 in the handle 7. The tray 2 has two pairs of jaws 3, 4 and 5, 6 for centering a cassette inserted in the tray. The jaws of each pair are coupled together and move isocentrically in respect to the center of the tray 2. Each pair of the jaws move independently of the other. When the tray 2 is pulled out of the cabinet to the end position by the handle 7, the jaws 3, 4 open automatically to full size. The jaws 5, 6 can be opened by (a) pulling out the handle 8 or (b) in a one-hand operation by pushing the jaw 5 into the cabinet with a film cassette being inserted, then the jaw 6 linked to the jaw 5 will open automatically and the cassette can be inserted under a lip 9. The lip 9 on the jaw 5 and the lip 10 on the jaw 6 prevent the cassette from falling out when the cabinet 1 is used in the vertical or upside down positions. In another embodiment of this disclosure the pair of the jaws 5, 6 is connected to the cabinet 1 in such a way that both pairs of the jaws open automatically together when the tray is pulled out. A choice between these two embodiments depend on a user's preference and specific applications. For example, when the cabinet 1 is used in the vertical or upside down position an automatic opening of the jaws 5, 6 together with the jaws 3, 4 will result in the cassette falling out.

A grid 12 can be placed in a frame 14 either (a) from the top by unlocking flippers 17 or (b) from the front by opening a grid frame lock 15 together with a spring 13, then sliding the frame 14 up to the front to the position in which the flippers 17 can be unlocked and the grid can be inserted or removed. The grid frame lock 15 holds the progressive spring 13 in tension all the time except when the grid is being replaced from the front.

Figure 3:
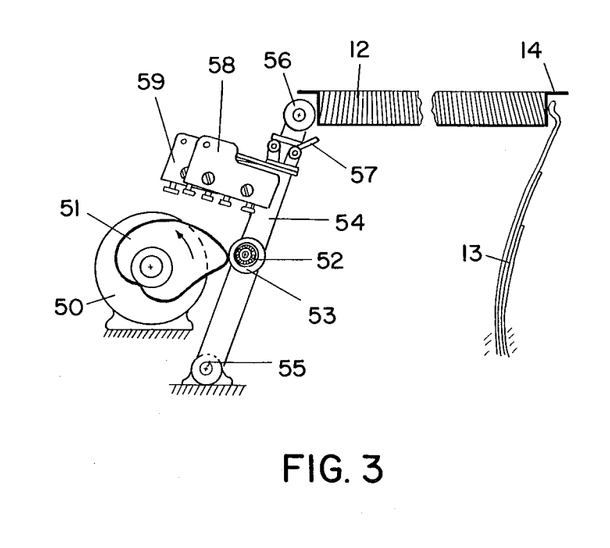
FIG. 3 illustrates means for actuating a grid in the grid frame.

The grid 12 inserted into the frame 14 moves on the ball rolling slides from the front to the back of the cabinet 1 whenever actuated by the motor drive system 16 described in FIG. 3. The motor drive system 16 is disposed in the back of the cabinet 1. This location and the compactness of said assembly allows reduction of the width of the cabinet 1 by at least the width of said system and, therefore, for a longer travel of the cabinet in the X-ray table and, thus, for an additional coverage of a patient.

Stationary grids are also used in some applications; a grid cabinet for stationary grids, according to this disclosure, is identical to the aforementioned grid cabinet, except for the absence of the motor drive system 16.

Figure 2A:
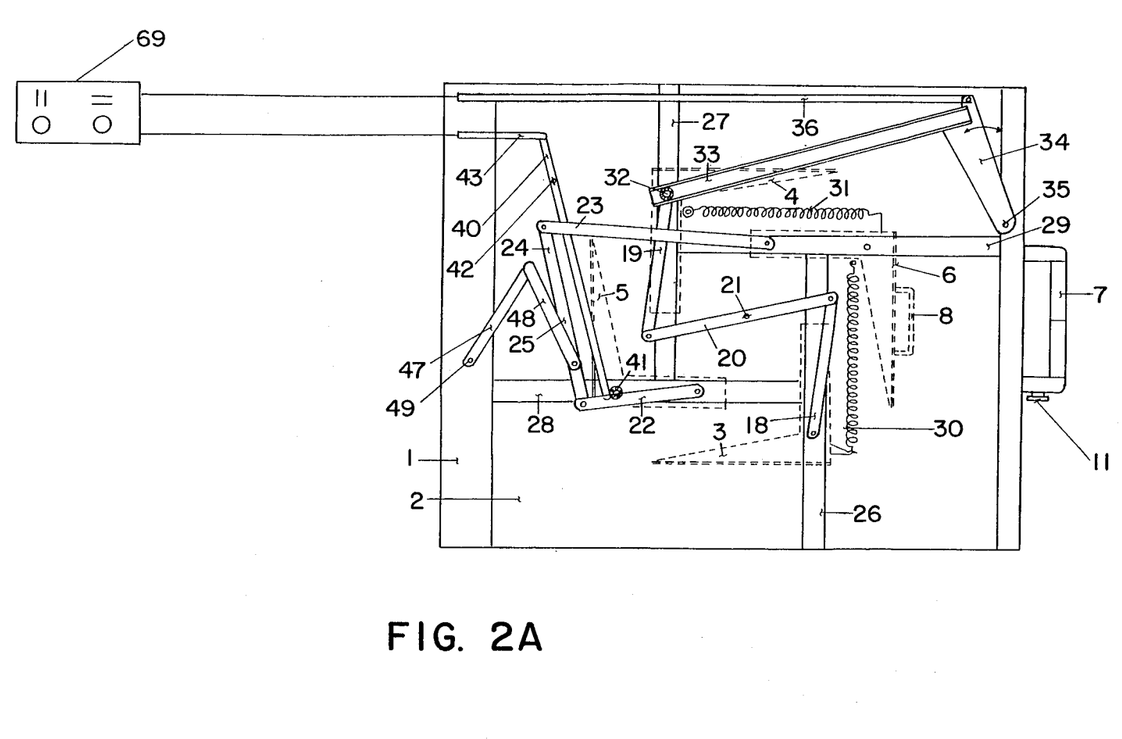
FIG. 2A illustrates the tray with an electronic control of the collimator.
Figure 2B:
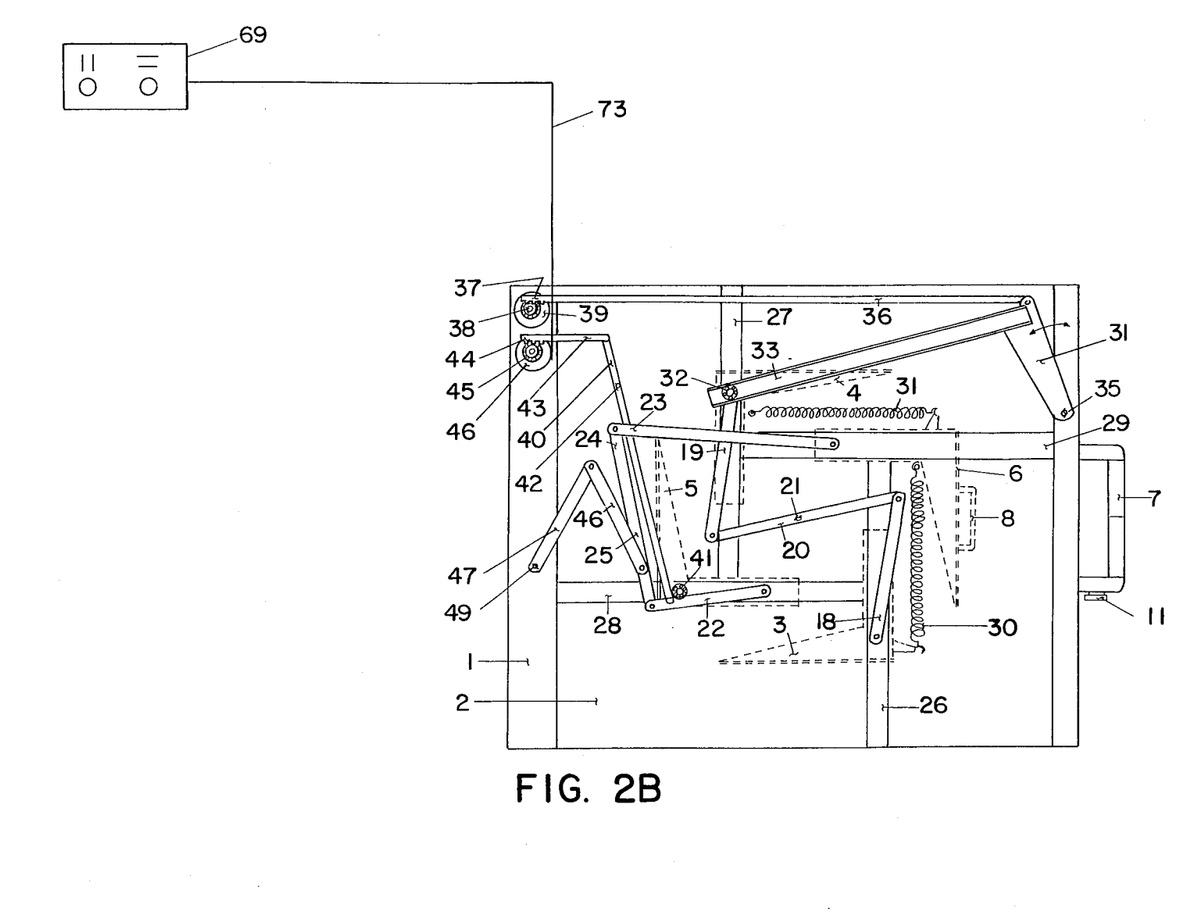
FIG. 2B illustrates the tray with a mechanical control of the collimator.

FIG. 2 illustrates the tray 2 with the cassette centering jaws 3, 4, 5, 6 and means for sensing both the width and the length of the cassette, continuously variable throughout the range of sizes. The tray 2 is shown in the position slid all the way into the cabinet 1.

The jaws 3, 4 are connected by respective arms 18 and 19 to the arm 20 which pivots about the shoulder rivet 21 placed in the center of the tray 2. The jaws 5, 6 are connected by the respective arms 22 and 23 to the arm 24 which pivots about the pivot point 25 placed toward the back of the tray 2. The jaws 3, 4, 5, 6 move on ball rolling slides in respective channels 26, 27, 28, 29. The channels 26, 27, 28, 29 are offset in respect to the point 21 and are longer than one half of the tray dimensions to provide a longer travel path of the jaws than the largest difference in the cassette sizes in order to have enough structural distance between the balls of said slides and better rigidity.

Movement of one of the jaws of the pair 3, 4 causes the other jaw of said pair through the linking arms 18, 19, 20 to move simultaneously and center the cassette between said jaws. Similarly, the jaws 5, 6 are coupled together by the linking arms 22, 23, 24 and movement of one of the jaws of the pair 5, 6 causes the other jaw of said pair to move simultaneously and center the cassette between said jaws. The jaws 3, 4 are retracted by the spring 30 and the jaws 5, 6 are retracted by the spring 31. The tension of the springs 30, 31 holds the cassette in the center of the tray 2.

When the tray 2 is being pulled out of the cabinet 1 by the handle 7, firstly, the bearing 32 attached to the jaw 4 rolls in the channel 33 to the end of said channel, then an arm 34 connected to the channel 33 starts pivoting about the pivot point 35 affixed to the cabinet 1 and not to the tray 2 and causes the jaws 3, 4 to open to the full gap.

When the tray 2 is inside the cabinet 1, one dimension of the cassette is determined by the position of the jaw 4 and the bearing 32 in the channel 33. The position of bearing 32 determines, in turn, the position of the arm 34 and a sensing arm 36 extending from the latter to a rack 37. The rack 37 rotates gear 38 on potentiometer 39 disposed in the cabinet 1. The other dimension of the cassette is determined by the position of the jaw 5 and the arm 40 actuated by the bearing 41 attached to the jaw 5. A sensing arm 43 extends from the arm 40 to a rack 44 and moves as the arm 40 pivots about the pivot point 42 affixed to the cabinet 1. The rack 44 rotates the gear 45 on the potentiometer 46 disposed in the cabinet 1. The potentiometers 39, 46 send signals to an X-ray collimator which adjust the collimator 69 in a relationship consistent with the X-ray film cassette held by the tray.

In another embodiment of this invention the sensing arms 36 and 43 are connected by a mechanical linkage 71 directly to the collimator's shutters 70 and automatically adjust the shutters to match the fields of an X-ray beam with the film size as shown in FIG. 2A. This system does not require potentiometers nor servomechanisms and is less expensive and simpler.

Still in another embodiment of this invention in place of the potentiometers 39, 36 incremental encoders can be used.

For an automatic opening of the jaws 5, 6 together with the jaws 3, 4 the arm 24 is connected to hinge arms 47 and 48. The hinge arm 47 is affixed to the cabinet 1 at the pivot point 49. When the handle 7 is being pulled out, firstly, the hinge arms 47 and 48 extend completely and hold the arm 24, then said arm starts moving and opening the jaws 5, 6. For a manual opening of the jaws 5, 6 the arms 47, 48 are disconnected from the arm 24.

FIG. 3 illustrates means for actuating the grid frame comprising the motor drive system 16. A variable speed motor 50 when operating rotates a cam 51 which in turn actuates a cam follower 52 with an offset bushing 53. The cam follower 52 is attached to an arm 54 which pivots about the pivot point 55. On the opposite end of the arm 54 a roller 56 pushes the grid frame 14 counter to the tension of the progressive spring 13 which holds the frame 14 in contact with the roller 56. An actuator 57 affixed to the arm 54 actuates microswitches 58, 59. In another embodiment a light breaking device can be used in place of said microswitches.

The microswitch 58 brings the motor 50 to the starting position also known as the homing position when the exposure switch is disconnected. The cam 51 is shown in the homing position. The microswitch 59 initiates an exposure whenever the cam follower 53 is at the point of the steepest curvature of the cam 51, that is when the grid 12 in the frame 14 is moving at the highest speed.

The shape of the cam 51 is designed to insure: firstly, rapid but controlled release of the spring 13; secondly, gradual decrease in the grid speed; thirdly, reversing the direction of the grid travel in a very short time; and fourthly, progressive slowing of the spring loading when the spring tension increases.

The function of the arm 54 is to increase the length of the grid travel as compared to the conventional designs and to keep the motor drive system 16 compact enough to place it in the back of the cabinet 1.

The bushing 53 on the cam follower 52 has an offset outside diameter compared to the hole in the bushing and the ratio of the circumference of the bushing 53 to the circumference of the cam 51 is equal to an odd number. This design insures that the reversing of the grid travel direction takes place at random points within the distance between grid lines and, therefore, prevents the grid lines from being photographed.

Figure 4:
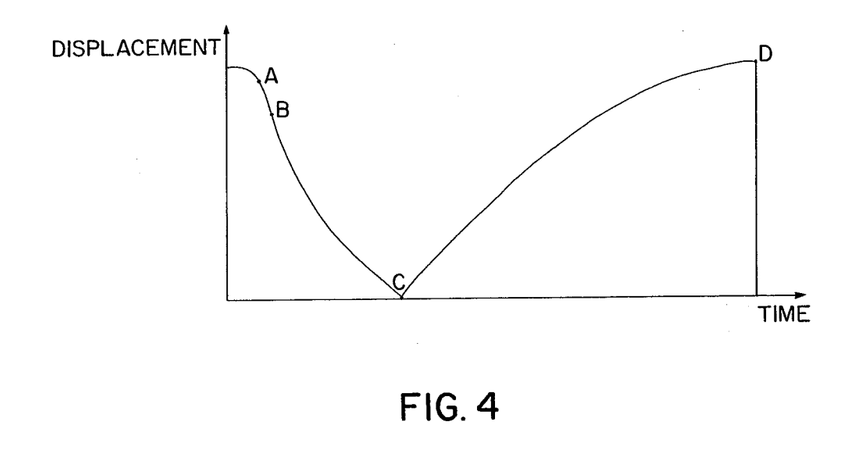
FIG. 4 illustrates graphically the characteristics of the grid movement.

FIG. 4 illustrates graphically the characteristics of the grid movement; one cycle of the grid travel is shown. A displacement of the grid from its starting position is shown on the vertical axis and the time is presented on the horizontal axis. The initial point (0,0) on the graph represents the grid at the homing position when the progressive spring 13 is fully loaded. At the time zero the motor is turned on, said spring is released and the grid moves to point A when acceleration reaches maximum. The cam 51 is designed to maintain the contact with the cam follower 52 with a minimum reduction in the acceleration.

An X-ray exposure starts at the point A when the grid travels at the maximum speed and for this reason allows for very short exposures to be taken without grid lines being photographed. Past the point B the speed of the grid is being progressively reduced as controlled by the shape of the cam 51 and the speed of the motor 50.

The grid movement at high speeds in the initial phase of the cycle, from A to B, allows for short exposures and, therefore, for reduced radiation doses to a patient when high speed films and rare earth screens are used.

Gradual decrease in the grid speed results in a longer cycle suitable for medium exposures to be taken before the travel direction of the grid is reversed at the point C. In addition, lower cycling frequency causes less vibrations and, thus, improved picture quality.

From the point C to the point D the grid speed is gradually further reduced for easier loading of the spring. At the longer exposure times, as used in tomography, the speed of the grid is not critical because there is enough time for several grid lines to pass the same point and, thus, not to be photographed.

The motor drive system 16 as described in FIG. 3 insures that the time for reversing the grid travel direction is short and that the reversing takes place at random points.

The variable speed motor 50 used in this invention allows for adjusting the frequency of the grid lines travel: (a) to accommodate different exposure times, (b) to avoid the said frequency to synchronize with the X-ray generator's frequency and (c) to reduce resonance vibration of the suspension.

Figure 5:
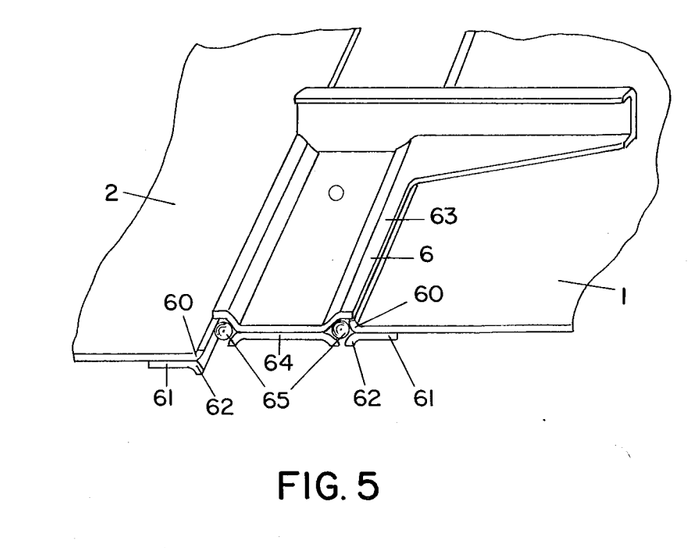
FIG. 5 illustrates ball rolling slides for the cassette centering jaws.

FIG. 5 illustrates the ball rolling slides also known as rails for the jaws 3, 4, 5, 6. The tray 2 has lips 60 bent 45 degrees up. Two identical rails 61 are spot welded to the bottom of the tray 2, each has a lip 62 symmetrical to the lips 60. The top part 63 and the bottom part 64 of said slides are formed as shown in FIG. 5 to provide a symmetrical four point loading on the ball 65, said parts 63, 64 constitute also an integral structure of respective jaw. This design allows for very small structural thickness and for preloading of the balls. Preloaded balls provide smooth motion, durability and no rattling.

Figure 6:
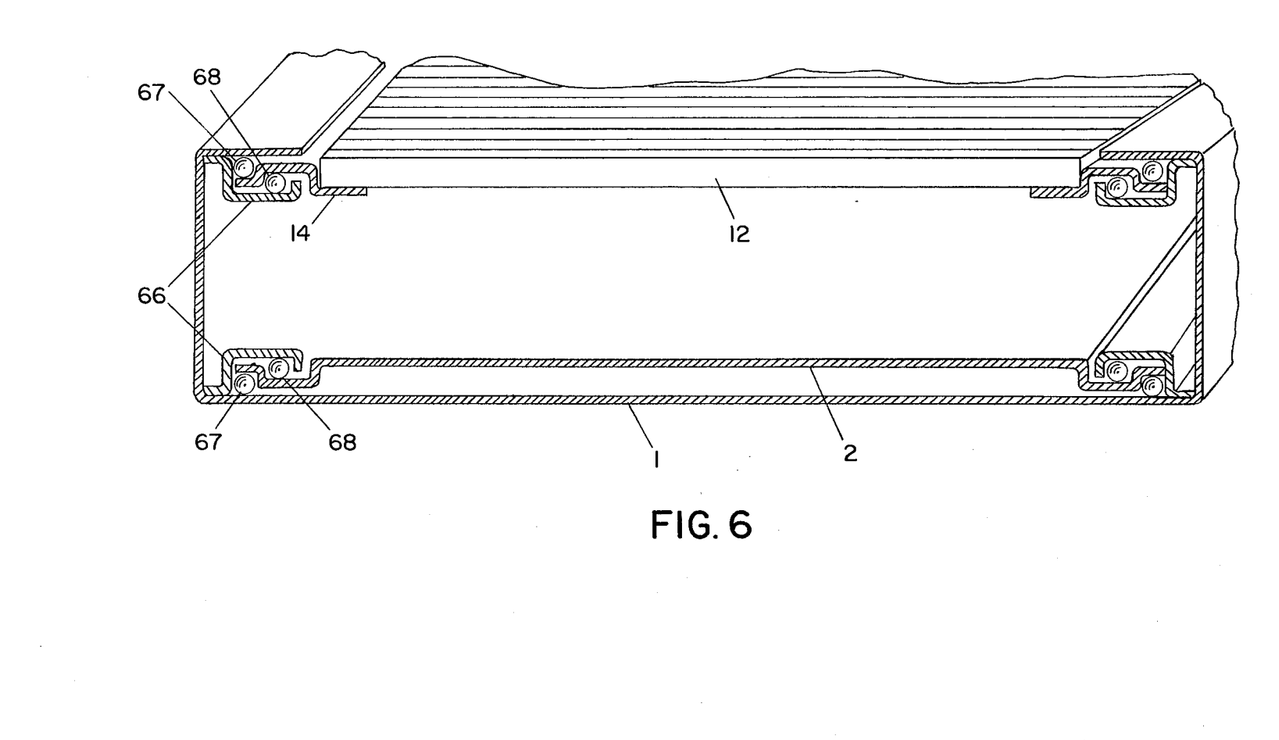
FIG. 6 illustrates ball rolling slides for the grid frame.

FIG. 6 is the cross section of one side of the ball rolling slides for the grid frame 14 movement. The grid cabinet 1 has a spot welded channel 66. The grid frame 14 with the grid 12 rolls between two rows of balls 67, 68 in the channel 66. The frame 14 formed as shown in FIG. 6 constitute an integral structure of said slides.

Ball rolling slides for the tray movement, wherein part of the structure of the cabinet and the tray constitute also an integral structure of said slides, are very similar to the ball rolling slides for the grid frame movement.

Utilization of all linear moving components of the device, comprising the grid cabinet, the cassette tray, cassette centering jaws and the grid frame, as an integral structure of the ball rolling slides significantly reduces dimensions of the device, improve its rigidity and at the same time lowers the cost.

Although, one detailed embodiment of the invention is illustrated in the drawings and previously described in details, this invention contemplates any configuration and design of the components which will accomplish the equivalent results.

I claim:

1. An apparatus for holding an X-ray film cassette in position comprising in combination:
    a. a cabinet including a compartment for slidably receiving a planar tray and an opening covered by a planar grid having a plurality of X-ray opaque grid lines disposed in a parallel relationship, wherein said planar grid is movable over a short distance in a first direction generally perpendicular to the direction of said grid lines:
    b. means for reciprocating said planar grid in directions parallel to said first direction;
    c. a planar tray included in said compartment of said cabinet, said planar tray including means for receiving the X-ray film cassette, said planar tray further including:
        1. a first pair of positioning means for positioning and holding the X-ray cassette therebetween, said first pair of positioning means connected to said planar tray in a sliding relationship in said first direction;
        2. a second pair of positioning means for holding the X-ray cassette therebetween, said second pair of positioning means connected to said planar tray in a sliding relationship in a second direction generally perpendicular to said first direction;
        3. a first mechanical linkage means including a first pivoting arm pivotably secured to said planar tray at a midsection thereof; a first connecting rod with one extremity pivotably connected to one extremity of said pivoting arm and the other extremity pivotably connected to one of said first pair of positioning means; a second connecting rod with one extremity pivotably connected to the other extremity of said pivoting arm and the other extremity pivotably connected to the other of said first pair of positioning means; and a limiting connector with one extremity secured to said first pivoting arm intermediate said one extremity and said midsection thereof and the other extremity connected to said cabinet wherein said limiting connector is extendable only to a maximum length;
        4. a second mechanical linkage means including a second pivoting arm pivotably secured to said planar tray at a midsection thereof; a third connecting rod with one extremity pivotably connected to one extremity of said second pivoting arm and the other extremity pivotably connected to one of said second pair of positioning means; a fourth connecting rod with one extremity pivotably connected to the other extremity of said second pivoting arm and the other extremity pivotably connected to the other of said second pair of positioning means; and an elongated guide pivotably coupled to said cabinet in an oblique angle with respect to said first direction, said elongated guide guiding a sliding element coupled to the combination of said fourth connecting rod and the other of said second pair of positioning means;

5. a first spring bias means pulling said first pair of positioning means towards one another and a second spring bias means pulling said second pair of positioning means towards one another; and 6. means for pulling said planar tray out of said cabinet; so that said first and second pairs of positioning means open and release the X-ray cassette when said planar tray is pulled out of said cabinet beyond said maximum length of said limiting connector and said first and second positioning means close and secure the X-ray cassette at a designated position when said planar tray is substantially inserted into said cabinet.

2. The combination as set forth in claim 1 wherein said combination includes a first actuator linkage with one extremity connected to the combination of said first pair of positioning means and having an actuating means included in the other extremity thereof, wherein said actuating means actuates a first position transducer means affixed to said cabinet, said first position transducer means indicating positions of said first pair of positioning means; and a second actuator linkage with one extremity connected to the combination of said second pair of positioning means and having an actuating means included in the other extremity thereof, wherein said actuating means actuates a second position transducer means affixed to said cabinet, said second position transducer means indicating positions of said second pair of positioning means.

3. The combination as set forth in claim 2 wherein said combination includes an X-ray collimator shutter control means controlled by signals from said first and second position transducer means, wherein said control means automatically positions the X-ray collimator shutters in a relationship consistent with the X-ray film cassette held by said planar tray.

4. The combination as set forth in claim 2 wherein said combination includes a handle means for pulling open said first pair of positioning means and means for disconnecting said limiting connector.

5. The combination as set forth in claim 1 wherein said combination includes mechanical linkage means coupling said first and second pair of positioning means to an X-ray collimator shutter control means, wherein said mechanical linkage means automatically positions the X-ray collimator shutters in a relationship consistent with the X-ray film cassette held by said planar tray.

6. The combination as set forth in claim 1 wherein each of said pair of positioning means connected to said planar tray in a sliding relationship includes an elongated sliding member supported by a pair of slide bearings respectively disposed along two edges thereof, wherein each of said pair of slide bearings comprises a first V-groove disposed following one of said edges of said elongated sliding member and a second V-groove included in said planar tray wherein said first and second V-grooves disposed in a closely spaced parallel relationship confines a plurality of bearing balls providing a frictionless sliding movement between said elongated sliding member and said planar tray.

7. An apparatus for holding X-ray film cassette during radiographic exposure comprising in combination:

a. a cabinet including a compartment for receiving a planar tray holding the X-ray film cassette, said cabinet including an opening for receiving X-ray therethrough;

b. a planar grid with a plurality of X-ray opaque grid lines disposed in a parallel relationship covering said opening, said planar grid disposed in a movable arrangement in directions parallel to a first direction generally perpendicular to the direction of said grid lines on a plane including said planar grid;

c. a spring bias means disposed adjacent to one extremity of said planar grid for exerting pressure on said one extremity, said one extremity being one of two extremities in said first direction; and d. a drive means disposed adjacent to the other extremity of said planar grid opposite to said one extremity for imposing reciprocating motions on said planar grid in directions generally parallel to said first direction, said other extremity being the other of two extremities in said first direction; wherein said drive means comprises variable speed motor, a noncircular cam nonrotatably mounted on a shaft of said variable speed motor; and a pivoting arm driven by said cam with a first extremity of said pivoting arm pivotably secured to the cabinet and a record of said extremity pivoting arm under a pressurized contact with said other extremity of said planar grid; wherein said drive means includes a bushing rotatably secured to said pivoting arm and under a pressurized contact with said cam, wherein said bushing has an offset outside diameter and a ratio of circumference of said bushing to circumference of said cam is an odd number.

8. The combination as set forth in claim 7 wherein said drive means comprising a variable speed motor, a noncircular cam nonrotatably mounted on a shaft of said variable speed motor; and a pivoting arm driven by said cam with one extremity pivotably secured to the cabinet and the other extremity under a pressurized contact with said other extremity of said planar grid.

9. The combination as set forth in claim 8 wherein said combination includes a bushing rotatably secured to said pivoting arm and under a pressurized contact with said cam, wherein said bushing has an offset outside diameter and a ratio of circumference of said bushing to circumference of said cam is an odd number.

10. The combination as set forth in claim 19 wherein said noncircular cam in combination with said bushing having the offset outside diameter provides a means for controlling amplitudes of reciprocating motion of said planar grid.

11. An apparatus for holding X-ray film cassette in position during X-ray examination, said apparatus comprising in combination:

a. a cabinet including a compartment with an opening;

b. a planar grid with a plurality of X-ray opaque grid lines disposed in parallel relationship in a first direction covering said an opening for receiving X-ray therethrough said planar grid resting on a pair of slide bearings respectively disposed along two opposite extremities of said planar grid parallel to a second direction which is perpendicular to said first direction wherein each slide bearing of said pair comprises a hollow bar with a slitted opening disposed parallel to said second direction and affixed to said cabinet and a slide bar supporting said grid, said slide bar having a cross section including two opposite right angle bends and slidably engaging said hollow bar, wherein combination of said hollow bar and said slide bar includes two parallel longitudinal cavities respectively confining two sets of plurality of bearing balls providing a frictionless sliding movement between said hollow bar and said slide bar;

c. means for reciprocating said planar grid in directions parallel to said second direction.

12. The combination as set forth in claim 11 wherein said combination includes a planar tray included in said compartment of said cabinet in a sliding relationship in said second direction, wherein said planar tray is slidably supported by a pair of slide bearings respectively included in two opposite extremities of said planar tray parallel to said second direction, wherein each slide bearing of said pair comprises a hollow bar with a slitted opening disposed parallel to said second direction and affixed to said cabinet and a slide bar with a cross section including two opposite right angle bends affixed to said planar tray and slidably engaging said hollow bar wherein combination of said hollow bar and said slide bar includes two parallel longitudinal cavities respectively confining two sets of plurality of bearing balls providing a frictionless sliding movement between said hollow bar and said slide bar.

* * * * *